US 6,814,344 B2
Nov. 9, 2004

(12) United States Patent
Peterson

(54) METHOD AND APPARATUS FOR CIRCULATING FLUIDS IN A BODY OF LIQUID

(75) Inventor: Francis C. Peterson, Spooner, WI (US)

(73) Assignee: Nesson Enterprises, River Forest, IL (US)

(*) Notice: Subject to any disclaimer, the term of this patent is extended or adjusted under 35 U.S.C. 154(b) by 180 days.

(21) Appl. No.: 10/302,234

(22) Filed: Nov. 22, 2002

(65) Prior Publication Data

US 2004/0099315 A1 May 27, 2004

(51) Int. Cl.$^7$ ................................................. B01F 3/04
(52) U.S. Cl. ....................... 261/87; 366/102; 366/326.1
(58) Field of Search ................... 261/87, 93; 366/102, 366/103, 155.1, 263, 325.1, 325.2, 326.1

(56) References Cited

U.S. PATENT DOCUMENTS

| | | | | |
|---|---|---|---|---|
| 57,285 A | * | 8/1866 | Burket et al. | 366/102 |
| 325,530 A | * | 9/1885 | Gore | 261/87 |
| 1,242,445 A | * | 10/1917 | Ittner | 261/87 |
| 1,925,777 A | * | 9/1933 | Sperling | 261/87 |
| 2,041,184 A | * | 5/1936 | Isenhour | 261/87 |
| 2,288,063 A | * | 6/1942 | Ashlock, Jr. | 261/87 |
| 2,784,150 A | | 3/1957 | Rose et al. | |
| 2,966,345 A | | 12/1960 | Burgoon et al. | |
| 3,491,880 A | * | 1/1970 | Reck | 261/87 |
| 3,650,513 A | * | 3/1972 | Werner | 261/87 |
| 3,773,015 A | | 11/1973 | Cruickshank et al. | |
| 3,788,616 A | | 1/1974 | Clough, Jr. | |
| 3,804,303 A | * | 4/1974 | Fassauer | 366/155.1 |
| 3,911,064 A | * | 10/1975 | McWhirter et al. | 261/87 |
| 3,940,461 A | | 2/1976 | Martin et al. | |
| 3,981,417 A | * | 9/1976 | Fassauer | 406/135 |
| 3,986,934 A | | 10/1976 | Müller | |
| 4,267,052 A | * | 5/1981 | Chang | 261/87 |
| 4,363,212 A | | 12/1982 | Everett | |
| 4,595,296 A | | 6/1986 | Parks | |
| 4,737,036 A | | 4/1988 | Offermann | |
| 4,774,031 A | | 9/1988 | Schurz | |
| 4,779,990 A | | 10/1988 | Hjort et al. | |
| 4,919,849 A | | 4/1990 | Litz et al. | |
| 5,156,788 A | | 10/1992 | Chesterfield et al. | |
| 5,176,447 A | | 1/1993 | Bata et al. | |
| 5,198,156 A | | 3/1993 | Middleton et al. | |
| 5,511,729 A | | 4/1996 | Husain | |
| 5,616,973 A | | 4/1997 | Khazanov et al. | |
| 5,993,158 A | * | 11/1999 | Young | 416/132 R |
| 6,036,357 A | | 3/2000 | Van Drie | |
| 6,322,056 B1 | | 11/2001 | Van Drie | |

* cited by examiner

Primary Examiner—John Rivell
(74) Attorney, Agent, or Firm—Fitch, Even, Tabin & Flannery

(57) ABSTRACT

In accordance with the present invention, a system is provided for circulating fluids, both gases and liquids, in a body of liquid. The system comprises a rotatable shaft having a tubular segment immersed in the body of liquid. The tubular segment of the shaft is in fluid communication with the fluid to be circulated. Means are provided for rotating the shaft. One or more tubular arms extend radially outwardly from the tubular shaft segment, and are in fluid communication with the tubular shaft segment. Each tubular arm comprises an extension spring which, under static conditions, is substantially straight but which upon rotation of the shaft is believed to be arcuately deflected by hydrodynamic force so as to impel fluid into the body of liquid. The system may be utilized for simply circulating the liquid, or for injecting a gas into the body of liquid. The method and apparatus of the present invention are particularly useful in effecting aeration of water to maximize the concentration of dissolved oxygen therein.

16 Claims, 2 Drawing Sheets

METHOD AND APPARATUS FOR CIRCULATING FLUIDS IN A BODY OF LIQUID

FIELD OF THE INVENTION

The present invention relates generally to systems for circulating fluids in a body of liquid. More particularly, it relates to a pump for circulating gases or liquids within a body of liquid.

BACKGROUND OF THE INVENTION

There are many instances in industrial, commercial and domestic operations in which fluids are circulated or mixed within a body of liquid. An example of a domestic use is circulation of water in a home aquarium, in which the water in the aquarium is circulated through a filter to remove suspended solids. In industrial and commercial operations it is frequently necessary to circulate the contents of a tank to keep particles in suspension, or to achieve a uniform admixture throughout the body of liquid. Circulation may be accomplished using pumps, propellers, or other means.

In addition to simply circulating the liquid contents in a body of liquid, it is sometimes desirable to inject other fluids into the liquid. For example, sewage and other waste water is aerated so that noxious organic matter in the waste is oxidized into benign forms. Other examples of aeration include aeration of fermentation broths to provide oxygen for the growth of microorganisms. Similarly, ponds, tanks, and lakes are aerated to sustain the life of aquatic plants and animals, such as in aquariums and live wells.

Essentially, aeration is effected by bubbling air into the aqueous medium. Ideally, the air should be introduced in the form of minute bubbles to maximize the surface area of the interface between gas and liquid and thereby increase the rate of mass transfer. Moreover, the bubbles should be uniformly distributed throughout the body of liquid, and should persist for as long as possible to maximize the amount of oxygen which is transferred to the liquid.

It is, of course, desirable to limit the cost of the equipment used to effect circulation and aeration. Moreover, it is desirable to minimize the amount of energy required to accomplish aeration. The simplest form of aeration apparatus comprises an air compressor together with the necessary piping, tubing, and nozzles or spargers to bubble compressed air into the liquid. Compressors are relatively costly. They are also noisy and inefficient. Moreover, the amount of agitation provided in the liquid by the emerging air is often insufficient to provide good mixing, and auxiliary mixing equipment therefore may be required.

Many types of aeration apparatus have been designed to increase the efficiency of mixing and mass transfer. An example of one apparatus particularly adapted for use in sewage treatment is disclosed in U.S. Pat. No. 2,966,345 to Burgoon et al. In accordance with the '345 patent, a tubular drive shaft extends vertically into waste water contained in a treatment tank, the shaft rotatably driven by an electric motor. Hollow arms extend outwardly from a hub at the bottom of the shaft, the arms having openings at their outer ends. As the shaft and arms rotate, a sub-atmospheric pressure region is created adjacent the ends of the arms, and air is transported by atmospheric pressure out of the openings and into the liquid. The arms function to mix and agitate the tank contents, and also to discharge a stream of air bubbles into the liquid.

With respect to apparatus to merely agitate the contents of a tank or circulate the same, a variety of approaches have been taken. Propellers and submersible centrifugal pumps fulfill this function, and are widely used. Such apparatus, particularly centrifugal pumps, require substantial machining in their manufacture, with accompanying increased cost.

GENERAL DESCRIPTION OF THE INVENTION

In accordance with the present invention, a system is provided for circulating fluids, both gases and liquids, in a body of liquid. The system comprises a rotatable shaft having a tubular segment immersed in the body of liquid. The tubular segment of the shaft is in fluid communication with the fluid to be circulated. Means are provided for rotating the shaft. One or more tubular arms extend radially outwardly from the tubular shaft segment, and are in fluid communication with the tubular shaft segment. Each tubular arm comprises an extension spring which, under static conditions, is substantially straight but which upon rotation of the shaft is believed to be arcuately deflected by hydrodynamic force so as to impel fluid into the body of liquid. The system may be utilized for simply circulating the liquid, or for injecting a gas into the body of liquid. The method and apparatus of the present invention are particularly useful in effecting aeration of water to maximize the concentration of dissolved oxygen therein.

DETAILED DESCRIPTION OF THE INVENTION

The construction and operation of the apparatus and method of the present invention are more particularly set forth in the following description, with reference to the drawing, in which.

Figure 1:
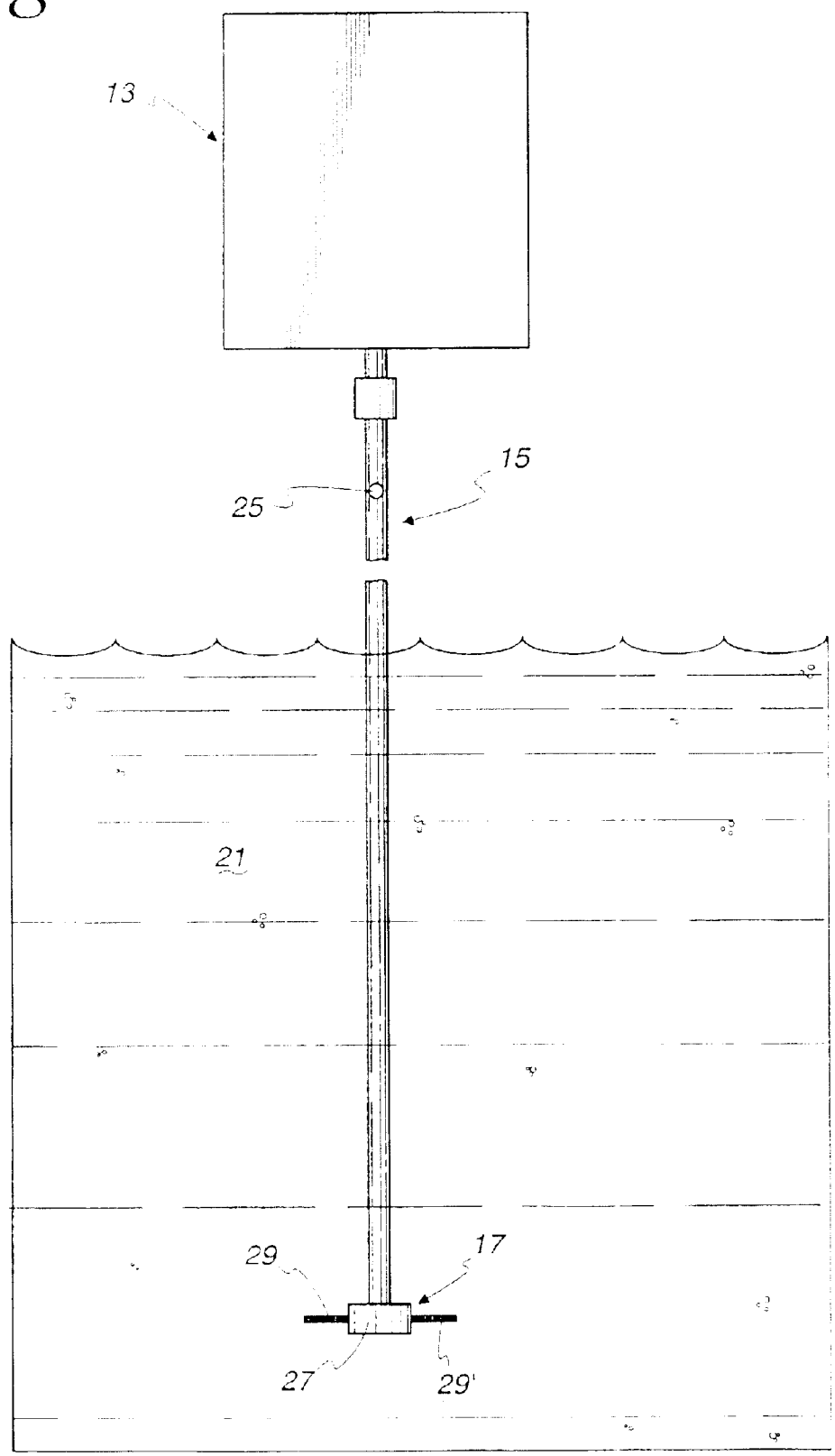
FIG. 1 is an elevational view, partly broken away, of an embodiment of apparatus constructed in accordance with the principles of the present invention, shown in operating relationship with a body of liquid.

In accordance with the present invention, and with reference to FIG. 1 of the drawings, there is provided an aeration system comprising a motor 13, a drive shaft 15, and a rotor 17. The motor 13, drive shaft 16 and rotor 17 are maintained in operating relation to a body of liquid 21. In the illustrated embodiment, the drive shaft 15 is a tubular shaft which includes an opening 25 through which air may enter the interior of the shaft.

Figure 2:
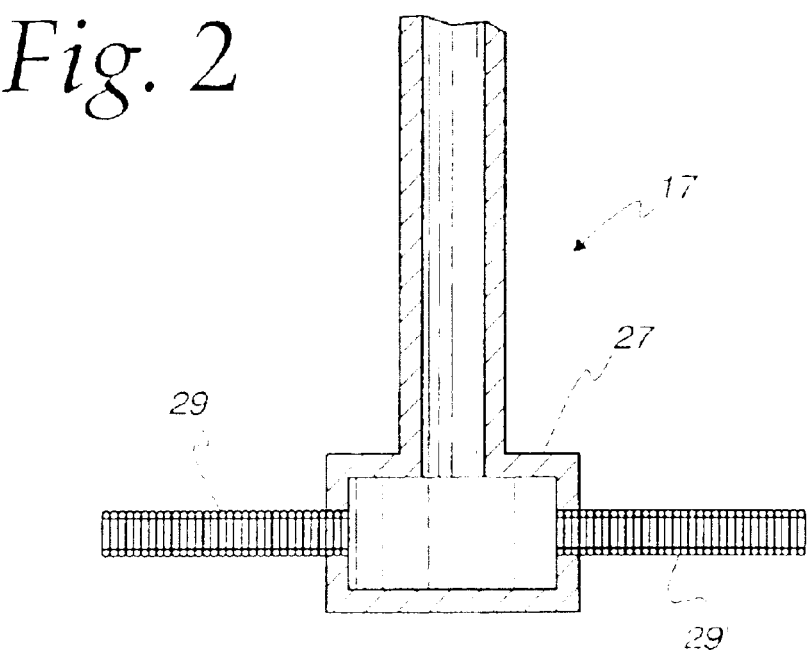
FIG. 2 is an enlarged fragmentary view of the rotor of the apparatus of FIG. 1 under static conditions.

The rotor 17 is shown in greater detail in FIG. 2. The rotor comprises a hub 27 and arms 29 and 29' extending radially outwardly from the hub. The arms 29, 29' comprise extension springs. As shown under static conditions in FIG. 2, the springs 29, 29' are substantially straight, with individual coils of the spring in contact with each other.

The interior of each of the springs 29, 29' is in fluid communication with the tubular shaft 15 through the hub 27. In the illustrated embodiment in which air is the only fluid to be injected into the liquid 21, the hub is closed at its distal end.

The operation of the circulation system will now be described as it is employed to aerate the liquid 21. Upon energization of the motor 13, the shaft 15 and rotor 17 are caused to rotate in the liquid 21. The hydrodynamic forces generated by rotation of the rotor 17 are believed to cause the arms to arcuately deflect from their static condition, so that they assume a somewhat parabolic shape akin to the shape of the impeller blades in a conventional centrifugal pump. Deflection of the springs causes gaps to open between adjacent coils of the spring, permitting entry of the liquid 21 into the interior of the springs 29, 29'. Having entered the interior of the springs 29, 29' the liquid is centrifugally impelled outwardly through the open ends of the springs.

It is further believed that the centrifugal pumping of liquid through the arms 29, 29' creates a sub-atmospheric pressure in the hub 27, so that air is transported through the opening 25 in the shaft 15 and thence downwardly through the shaft 15 and into the arms 29, 29'. Vigorous mixing of air and liquid takes place in the arms, so that a dispersion of finely divided air bubbles in the liquid is expelled from the arms into the body of liquid 21. The dispersion of air in liquid is expelled from the ends of the arms 29, 29' at high velocity, resulting in conditions which optimize contact between air and liquid.

Figure 3:
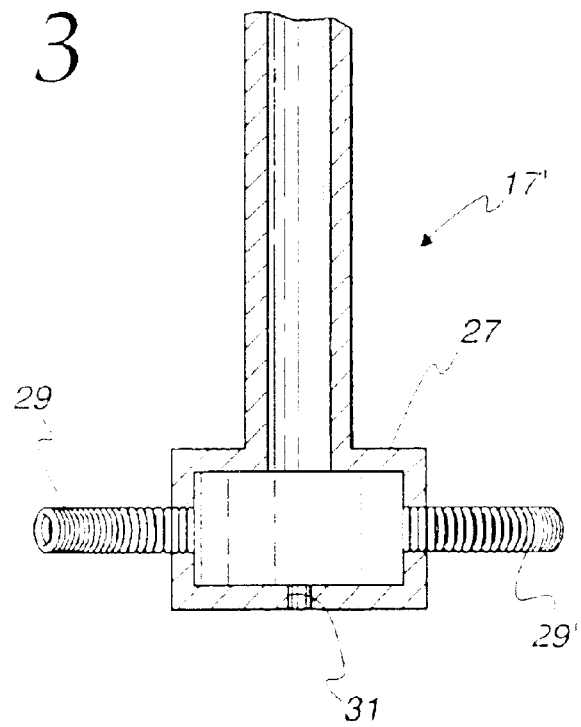
FIG. 3 is an enlarged fragmentary view of an alternative embodiment of the rotor of the apparatus of FIG. 1.

In an alternative embodiment shown in FIG. 3, an opening 31 is provided in the hub 27 to admit liquid therethrough. In this embodiment, the rotor 17 operates very similarly to a conventional centrifugal pump, with liquid flowing from the body of liquid into the bottom of the hub 27 to augment the volume of liquid impelled outwardly through the arms 29, 29'. This results in increased volume of circulated liquid. The size of the opening 31 may be varied to provide optimum aeration and circulation.

In another embodiment (not illustrated) the rotor of FIG. 3 is utilized, but the tubular shaft 15 is obstructed so that air does not flow into the hub 27. In this embodiment, the system operates solely as a centrifugal pump for the liquid 21. An important advantage of the rotor of the present invention is that efficient and effective pumping of liquids is achieved without a volute, and the apparatus requires minimum machining.

A further feature of all the embodiments described and shown herein is that the direction of rotation of the rotor 17 may be reversed without adversely affecting the operation thereof. Thus, fouling of the rotor may be overcome by simply periodically reversing its direction of rotation.

In a specific embodiment of the method and apparatus of the present invention, in the embodiment illustrated in FIGS. 1 and 2, a one-half horsepower electric motor rotating at about 3,400 r.p.m. is used to drive a tubular shaft having a nominal diameter of about 0.75 inches. The springs comprising the rotor arms are extension springs having an outside diameter of about 0.4 inches and are about 2.75 inches long.

The drawing and the foregoing description are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A system for circulating fluids in a body of liquid comprising:

a rotatable drive shaft having a tubular segment immersed in the body of liquid, said tubular shaft segment being in fluid communication with the fluid to be circulated;

means for rotating said shaft, and a tubular arm extending radially outwardly from said tubular shaft segment in fluid communication therewith, said tubular arm comprising an extension spring.

2. A system for circulating fluids in a body of liquid comprising:

a rotatable drive shaft having a tubular segment immersed in the body of liquid, said tubular shaft segment being in fluid communication with the fluid to be circulated;

means for rotating said shaft, and a tubular arm extending radially outwardly from said tubular shaft segment in fluid communication therewith, said tubular arm comprising an extension spring which under static conditions is substantially straight but which upon rotation of said shaft is arcuately deflected by hydrodynamic force so as to impel fluid outwardly therefrom.

3. A system in accordance with claim 1 wherein the fluid to be circulated comprises a liquid and a gas.

4. A system in accordance with claim 1 wherein the fluid to be circulated comprises a liquid.

5. A system in accordance with claim 4 wherein the liquid to be circulated is that contained in the body of liquid.

6. A system in accordance with claim 3 wherein the gas is air.

7. A system in accordance with claim 1 having a plurality of tubular arms.

8. A system in accordance with claim 3 wherein mass transfer is effected between the gas and the body of liquid.

9. A system in accordance with claim 6 wherein mass transfer is effected between the air and the body of liquid.

10. A method for circulating fluids in a body of liquid, comprising:

establishing a path for the flow of fluids into the body of liquid through a tubular arm immersed therein, the tubular arm comprising an extension spring which under static conditions is substantially straight, and rotating said extension spring about one end thereof to impel fluids therethrough into the body of liquid.

11. The method of claim 10 wherein the fluid comprises a liquid and a gas.

12. The method of claim 10 wherein the fluid is a liquid.

13. The method of claim 12 wherein the liquid is that contained in the body of liquid.

14. The method of claim 11 wherein the gas is air.

15. The method of claim 11 wherein mass transfer is effected between the gas and the body of liquid.

16. The method of claim 14 wherein mass transfer is effected between air and the body of liquid.

* * * * *